United States Patent Office 3,636,180
Patented Jan. 18, 1972

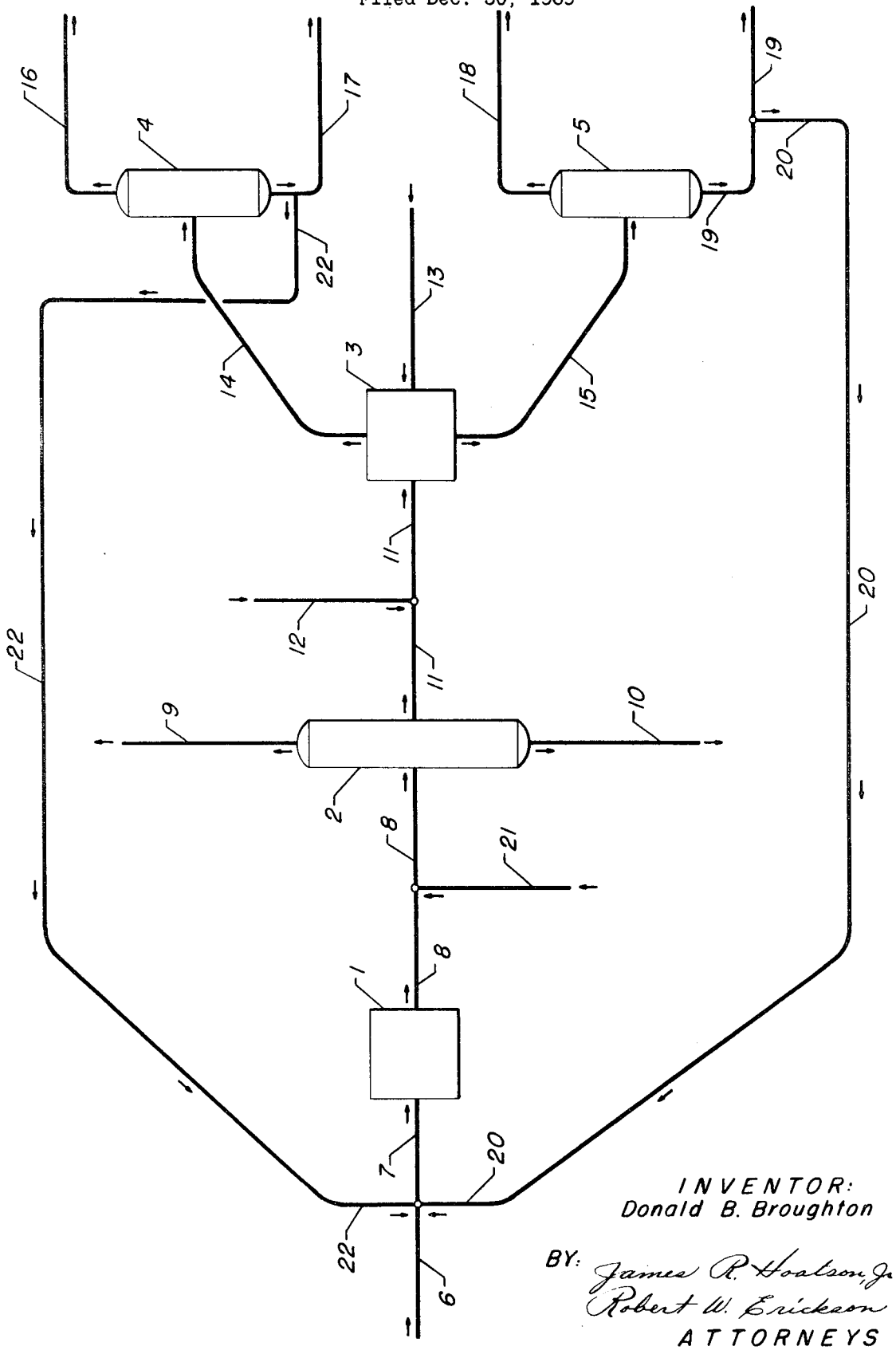

3,636,180
COMBINATION ISOMERIZATION AND AROMATIC SEPARATION PROCESS
Donald B. Broughton, Evanston, Ill., assignor to Universal Oil Products Company, Des Plaines, Ill.
Filed Dec. 30, 1969, Ser. No. 889,116
Int. Cl. C07c *5/24, 7/12*
U.S. Cl. 260—668 A          32 Claims

ABSTRACT OF THE DISCLOSURE

A combination process for the production and recovery of a particular aromatic hydrocarbon. The combination process comprises an isomerization zone which is operated in conjunction with a separation zone. The separation zone effects the selective adsorption of a particular aromatic compound passed to the separation zone thereby rendering two streams concentrated in certain aromatic components. One of the streams concentrated in the certain aromatics is recycled to an isomerization zone where additional production of feed components is effected allowing an eventual complete production of a particular product produced by the isomerization zone. Feed streams can be passed directly into the adsorption zone or into the isomerization zone depending on the feed composition.

BACKGROUND OF THE INVENTION

Field of the invention

The field of art to which this claimed invention pertains is general refinery operations. More specifically, the claimed invention relates to the isomerization of aromatic stock in an isomerization zone with the subsequent concentration of particular component therefrom in a separation zone. A recycle stream is passed to said isomerization zone which comprises one of the concentrated streams from the separation zone to effect the production of additional quantities of the aromatic component or components not recycled to the isomerization zone.

Description of the prior art

Refinery operations in which it is preferred to concentrate a particular component from a stream containing various isomers generally encounter problems of the physical separation of the various isomers into different pure or substantially pure or substantially pure isomer streams. Typically, in refinery operations in the petrochemical industries the problems encountered in isomer separation center around xylene and diethylbenzene separation. Specifically, in xylene production the boiling points of the orthoxylene, metaxylene, paraxylene and ethylbenzene are substantially close so that the fractionation techniques are not practicable. Present day technology is directed towards crystallization where xylene separation is effected and in particular, where a paraxylene stream is required in substantially purified form. However, the problem encountered in paraxylene crystallization centers around the reaching of a eutectic mixture in the crystallization of paraxylene from streams containing para and metaxylene and in some cases the other xylene isomers. Typically in crystallization techniques, paraxylene is crystallized out of the mixture containing other xylenes. In order to maintain relatively pure paraxylene crystals the remaining mother liquor generally contains a quantity of a paraxylene which prevents the total separation of paraxylene on a once through operation in the crystallization zone. The mother liquor can be passed into an isomerization zone in which additional paraxylene can be produced and which can subsequently pass into a crystallizer for additional recovery of paraxylene.

The process of the present invention allows a refiner to use a particularly selected adsorbent in combination with an isomerization zone to the effect the essential total removal of a particular isomer from an isomerization effluent stream. The present invention will solve the problem encountered in the prior art in that a recycle stream which is passed back to an isomerization zone from the present adsorptive-separation zone contains essentially none of the material withdrawn from the separation zone as product. The present invention reduces the total volume of recycle material to an isomerization zone, while increasing the once through efficiency with respect to paraxylene recovery when compared to typical crystallization techniques.

SUMMARY OF INVENTION

It is an object of the present combination invention to provide a process for the separation and recovery of a selected hydrocarbon product while producing additional quantities of the recovered product in an isomerization zone by isomerizing a stream deficient in the component which is recovered. It is another and more specific object of the present invention to present a combination process which allows the separation and recovery of paraxylene from a C$_8$ isomer mixture with the subsequent recycling of a paraxylene deficient stream to an isomerization zone to effect the additional production of paraxylene which can subsequently be recovered from said isomerization effluent. It is another object of the present invention to present a combination process which allows the separation and recovery of metaxylene or ethylbenzene product from a C$_8$ aromatic isomer mixture with the subsequent recycling of a stream deficient in one of the two aforementioned isomers to effect additional production of the recovered product.

In adsorptive-separation processes, an important factor that is used to determine the ability of a particular adsorbent to separate components of a feed is the selectivity of the adsorbent for one component as compared to another component. The selectivity (B) as used throughout this specification is defined as the ratio of two components of an adsorbed phase over the ratio of the same two components in an unadsorbed phase at equilibrium conditions and is expressed in equation form in Equation 1 below.

$$\text{Selectivity} = B_{x/y} = \frac{(x/y)a}{(x/y)u} \quad (1)$$

where $x$ and $y$ are two components of the feed represented in volume percent and the subscripts $a$ and $u$ represent the adsorbed and unadsorbed phases respectively. The equilibrium conditions as defined here were determined when the feed passing over a bed of adsorbent did not change composition after contacting the bed of adsorbent, or in other words, there was no net transfer of material occurring between the unadsorbed and adsorbed phases when the selectivity of the two selected components was measured.

As can be seen where the selectivity of two components approaches unity, there is no preferential adsorption of one component by the adsorbent. As the value of B becomes greater than unity, there is a preferential selectivity by the adsorbent of one component. When comparing the selectivity of component $x$ over component $y$, a B larger than unity indicates preferential adsorption of component $x$ within the adsorbent while a B less than unity would indicate that component $y$ is preferentially adsorbed leaving an unadsorbed phase richer in component $x$ and an adsorbed phase richer in component $y$.

In adsorptive-separation processes separation can be effected through the use of a crystalline aluminosilicate zeolite adsorbent. Common zeolites which can effectively separate the various aromatic isomers are the synthetically-prepared Type X and Y zeolites containing selected cations at the exchangeable cationic sites within the zeolite crystal structure.

Both the natural and synthetic alumino-silicates may be used as adsorbents in the present invention. A crystalline zeolitic aluminosilicate encompassed by the present invention for use as an adsorbent includes aluminosilicate cage structures in which the alumina and silica tetrahedra are intimately connected with each other in an open three-dimensional crystalline network with the tetrahedra cross-linked by the sharing of oxygen atoms. The spaces between the tetrahedra are occupied by water molecules prior to dehydration. Subsequent partial or total dehydration results in crystals interlaced with channels of molecular dimensions. Thus, the crystalline aluminosilicates are often referred to as molecular sieves. In the hydrated form, crystalline aluminosilicates may be reprsented by the formula represented in Equation 2, $$M_{2/n}O:Al_2O_3:wSiO:yH_2O \qquad (2)$$

where M is a cation which balances the electrovalence of the tetrahedra, $n$ represents the valence of the cation, $w$ represents the mols of $SiO_2$, and $y$, the mols of water. The cations may be any one of a number of cations such as, for example, certain selected cations from the alkali metal cations or the alkaline earth cations.

Crystalline aluminosilicates which find use as adsorbents in the process of this invention possess relatively well-defined pore structures. The exact type aluminosilicate is generally referred to by the particular silica-alumina ratio and the pore dimensions of the cage structures. The faujasites are commonly represented as Type X and Type Y structured aluminosilicates and are defined by their varying silica to alumina ratios.

The Type X structured zeolite can be represented in terms of the mol ratio of oxides as represented in the following Equation 3, $$0.9 \pm 0.2 M_{2/n}O:Al_2O_3:2.5 \pm 0.5 SiO_2:yH_2O \qquad (3)$$

where M represents at least 1 cation having the valence of not more than 3, $n$ represents the valence of M, and $y$ is a value up to about 8, depending upon the identity of M and the degree of hydration of the crystal. Zeolite Type X is described in U.S. Pat. No. 2,882,244.

The Type Y structured zeolite may be represented in the terms of the mol ratio of oxides for the sodium form as represented in the following Equation 4, $$0.9 + 0.2 Na_2O:Al_2O_3:wSiO_2:yH_2O \qquad (4)$$

where $w$ is a value of from about 3 to about 9 and $y$ is a value less than about 8.

The exchangeable cationic sites for the Type X and Y zeolites, in general, can be defined as represented in Equation 2 above as "M."

Cationic exchange of base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange or base exchange methods that the cation exchange may take place using individual solutions of desired cations to be placed on the molecular sieve or can use exchange solutions containing mixtures of the cations which are desired to be exchanged onto the crystalline aluminosilicate zeolite.

In this specification, the terms Type X and Type Y structured zeolites shall refer to the basic crystalline aluminosilicates described in Equations 3 and 4 above which contain any one or combination of cations indicated below.

The cations or metals which can be placed on the Type X or Type Y structured zeolites include potassium, barium, silver, cerium, praseodymium, neodymium, samarium, barium and potassium, beryllium and potassium, magnesium and potassium, rubidium and potassium, cesium and potassium, rubidium and barium, cesium and barium, copper and potassium and combinations thereof or other combinations or single cations hereinafter indicated in Table I below.

The adsorption zone which employs adsorbents as previously described in much greater detail selectively adsorbs a particular hydrocarbon from a feed stream passed into that zone. Specifically, where isomer mixtures are fed into the adsorption zone containing the selected adsorbent one or more particular isomers are selectively retained by the adsorbent while most of the other components of the feed mixture occupy the external volume surrounding the adsorbent and are not adsorbed with the degree of tenacity that the selectively retained component is adsorbed. Typically, the basic operating conditions can include passage of feed stock in liquid or vapor phase through a bed of an adsorbent material. For ease of separation and for optimum contact area the adsorbent is a small particle material generally 20 to 40 mesh in size. The feed stock is contacted with the adsorbent at conditions which allow a portion of the feed stock and typically substantially all of a particular component present in the feed stock to be retained by the adsorbent. The less selectively retained component of the feed which is typically in the art referred to as a raffinate material, is removed from the adsorbent bed by contact with a third stream consisting of another hydrocarbon or a gaseous material or in some instances a material which can desorb the selectively retained components of the feed but which is diluted with another hydrocarbon or other material to such an extent that there is no desorption of the selectively retained material but a mere washing of the adsorbent of raffinate material. Thereafter, the adsorbent is contacted with a desorbent material at desorption conditions to effect the removal of the selectively retained component of the feed stock from an adsorbent. The adsorption and desorption operating conditions can be effected in either liquid or vapor phase at substantially same or different pressures and substantially the same or different temperatures. Adsorption conditions can include temperatures in the range of from about ambient to about 250° C. and pressures generally above atmospheric and in most instances within the range from about atmospheric to about 1,500 p.s.i.g.

Desorption conditions can be within those recited for the adsorption conditions. In some instances, both vapor and liquid combination operations can be effected, that is, adsorption can be effected in a liquid phase and desorption in the vapor phase, or adsorption in the vapor phase and desorption effected in the liquid phase with various temperature and pressure changes associated with the requirements to perform the operations in different phases. When dealing with high molecular weight feed stocks it is generally preferred to use liquid phase operations for both adsorption and desorption operations in order that the temperature requirements in the process be substantially reduced thereby reducing the possibility of any side reactions from occurring at the higher temperatures, through any catalytic effects which may be present within the adsorption.

The overall operations effected in the adsorption zone can be performed by typical swing-bed type operations or by employing the simulated moving-bed countercurrent flow operations. It is well known to those skilled in the separation art that manifold systems can be incorporated, where swing-bed operations are to be used, to allow continuous production of extract and raffinate streams by manipulating the input and output streams to the individual adsorption beds to effect continuous adsorption and desorption steps. The simulated moving-bed countercurrent flow operations are typically performed through the use of a series of inlet and outlet lines connected to an elongated bed of adsorbent which lines are advanced in the direction of the general fluid flow through the fixed-bed by using a particular type of a rotating valve which allows the various operations to take effect simultaneously at different areas of the fixed-bed. When observing the operations from a certain location within the adsorption bed, adsorption and desorption cycles are seen in a repetitive manner and in a way which allows the efficient production of the desired extract and raffinate streams. The overall countercurrent fixed-bed simulated moving-bed type operations are generally demonstrated in U.S. Pat. No. 2,985,589. The operations of the adsorption or separation zone of this invention are similar in some ways to the operations disclosed in that in the reference patent.

Desorbents which can be used in the operation of the adsorption zone include aromatics such as benzene, toluene, diethylbenzene or other aromatics which are relatively easily separated from the material fed to the adsorption zone and which easily displace the extract material from the adsorbent. Additionally, gases may be used as a desorption medium where in most cases the desorption step is carried out at a temperature higher than the temperature at which the para-xylene is adsorbed or a pressure lower than the pressure at which adsorption occurs.

The charge stocks that may be used in the separation process of this combination invention are those charge stocks which are not easily separated by physical separation, that is, generally by fractional distillation. Specifically, the charge stocks which are contemplated to be used in the process of this invention include aromatic hydrocarbons. Typically, the aromatic hydrocarbons are used as feed stocks in the process of this invention and separation effects the adsorption of an aromatic isomer from a feed stock containing a selected group of aromatic isomers. Feed stock which can be used in the process of this invention include the $C_8$ aromatic hydrocarbon or typically the orthoxylene, metaxylene, paraxylene, and ethylbenzene isomers, or the $C_9$ or $C_{10}$ aromatic isomers. Higher aromatic isomers may be used. It has been found that the increase in molecular weight of a feed stock presents difficulties in obtaining good selectivities along with problems of commercial adaptations because of the fact, that in general in adsorption separations, the higher aromatic hydrocarbons are much slower in their entering and leaving the adsorbent and generally require quite large contact times to effect the separation which can be quite disadvantageous. It is contemplated that in addition to the particular isomers which are desired to be passed into the adsorbent separation zone for separation there can be included various relatively small quantities of other components comprising other aromatic hydrocarbons or paraffins or cycloparaffins. In some instances the presence of other hydrocarbon types can markedly reduce the adsorbent's effectiveness to the extent that these hydrocarbons must be fractionated out or be removed in some manner from a feed stock which is passed into the separation zone.

The isomerization zone employed in the combination process of this invention contains catalysts selected for their abilities to isomerize a particular raffinate material removed from the separation zone in order to produce additional quantities of the selectively retained component of the feed material passed into the separation zone.

Typical catalysts which are used in normal isomerization reaction zones include inorganic refractory oxides containing platinum group metals and generally also containing a quantity of a halide. Specific isomerization catalyst include platinum group metals on alumina, which also contain various quantities of fluorine, chlorine, or bromine. The relatively milder catalysts which contain palladium and chlorine on alumina can be used. The platinum containing isomerization catalyst generally being the more active species allows ethylbenzene to be converted to another $C_8$ aromatic isomer in cases where xylene isomers are to be separated although in the process a napthene intermediate is created which allows production of by-product toluene and light ends from the cracking of the cycloparaffin intermediate. Specific isomerization catalysts which can be used in the isomerization zone are those which contain approximately 0.75% weight palladium and approximately 0.9% chlorine on an alumina base which base contains approximately 3% to 7% by weight of a crystalline aluminosilicate generally selected from the species of mordinite. Other type isomerization catalysts which may be used include those which contain about 0.3% platinum and about 1% to about 3% weight fluorine and from about $\frac{1}{10}$% to about 1% chlorine all on an alumina base. The latter specifically disclosed catalyst generally being considered the more active species of the two. Other combinations of the platinum group metals including ruthenium, rhodium, palladium, osmium, iridium, and platinum may be used along with other metals from the Periodic Table depending on the particular feed stock being isomerized.

Isomerization zone operating conditions are determined by particular product distribution which is desired in the effluent stream from that zone, the particular feed stocks passed into that zone and the relative concentrations of the products in the feed stock. Typically, isomerization reaction zone operating conditions include temperatures within the range from about 200° C. to about 450° C., pressures from about atmospheric to about 100 atmospheres, liquid hourly space velocities based on fresh feed passed into the isomerization reaction zone of about from $\frac{1}{10}$ to about 20 with hydrogen to hydrocarbon feed molal ratios of from about 1 to about 20. Additionally, in some instances, to control or maintain catalytic activity, halogen addition to the feed stock which is passed to the isomerization zone may be effected. Concentration of halogen and feed stock can be from about 1 to about 1,000 p.p.m. depending on the catalytic activity desired in the isomerization zone and the relative length of operations of the catalyst in that zone.

DETAILED DESCRIPTION OF THE DRAWING

The attached drawing shows the combination process of this invention which includes an adsorption zone and an isomerization zone. The flow scheme shown in the attached drawing is simplified and does not contain valves, pumps, condensors, heat exchangers or other detailed process equipment which are presumed to be included and are not considered necessary for the general description of the combination process of this invention to those versed in the art.

Isomerization zone 1 effects isomerization of the recycle stream passed to it from the adsorbent separation zone 3 via separation means 5. Located between isomerization zone 1 and separation zone 3 is separation means 2. Streams withdrawn from separation zone 3 are passed to separation means 4 and separation means 5. Separation means 2, 4 and 5 are essentially fractionation columns of any suitable construction necessary in order to effectuate the separation of the streams passed into these fractionation zones as will be hereinafter and in more detail described. Streams passing into the combination process of this invention are indicated by lines 6, 12 and 21 which are fresh feed streams and line 13 which is a desorbent stream. Fresh feed stream 6 which also may be used to pass hydrogen gas into the isomerization zone is used when the feed stock used in the process of this invention contains a substantially deficient quantity of the component or components not recycled back to the isomerization zone while feed streams 12 and 21 are used when the feed contains significant concentrations of the component or components recycled to the isomerization zone. It is necessary, in instances where the fresh feed contains a low concentration of the concentrated components withdrawn from the separation zone but not recycled to the isomerization zone, that the feed stock be first passed through the isomerization zone and then into separation zone 3 and for the purposes of the present invention this particular feed stream is injected into the process, first into the isomerization zone 1. Fresh feed streams 12 and 21 which are alternate feed streams pass feed stock into the process into lines 8 or 11 which pass in separation means 2 or directly into separation zone 3. Line 13 is a desorbent line which contains a desorbent material which passes into the separation zone 3 from an external source which hereinafter will be defined.

Outlet streams from the overall combination process of this invention include lines 9, 10, 16, 17, 18, and 19. Line 9 which is located on separation means 2 is a light hydrocarbon outlet stream through which passes the materials which are generally cracked or reduced to molecular sizes smaller than the basic feed stock passed into the separation zone 3 and also is a hydrogen withdrawal stream. This material can comprise hydrogen plus $C_1$ through $C_6$ hydrocarbons and may even include $C_7$ aromatic hydrocarbons depending on the particular type of feed stock whether it be a $C_8$, $C_9$ aromatic, or a diethylbenzene isomer which is used as a feed stock in the process of this invention. Line 10 which passes out of separation means 2 withdraws the heavier molecular weight components from the material which passes out of isomerization zone 1, this material generally contains polymerized aromatics of a heavy nature and is removed in the bottom of a fractionation column.

In starting the basic process flow a recycle stream from separation means 5 which passes through line 20 and into line 7 passes into isomerization zone 1.

The effluent material from isomerization zone 1 passes through line 8 into separation means 2 which generally separates the lighter and heavier components from the zone. Most of the effluent from the isomerization zone 1 majority of the effluent material from the isomerization passes out of separation means 2 via line 11 and into separation zone 3. Alternate feed streams 12 and 21 are connected to lines 11 and 8 respectively. The material passing into adsorption separation zone 3 contacts an adsorbent in a manner so as to allow the selective adsorption of a particular hydrocarbon present in that material with the remaining material, generally referred to as raffinate material, passing out of separation zone 3 via line 15 and into separation means 5, separation means 5 allows the non-selectively retained components of the material passed into separation zone 3 to be separated from desorbent or other materials which because of the process operating conditions may be in admixture with raffinate material. The desorbent or other material is separated by fractional distillation and passes out of separation means 5 via line 18 while the non-selectively retained components of the material passed into separation zone 3 via line 11 are removed from separation means 5 via line 19. The material in admixture with the raffinate material is removed via line 18 and can be reused in a separation zone 3 and can pass into that zone via line 13 as indicated in the drawing. The raffinate material or extract materials can be collected with a portion of one being recycled to the "front end" of the process via line 20 or 22. Depending upon the quantity of raffinate or extract material desired to be recycled to isomerization zone 1 and the amount of either material desired to be recovered, various proportions of materials passing out of separation means 5 via line 19 can be controlled by valves or other flow control apparatus to allow various quantities of material to pass out of the process via line 19 or be recycled to the "front end" of the process via line 20. In a like manner various proportions of extract material passing out of separation means 4 via line 17 can be recycled to the "front end" of the process via line 22.

The selectively retained component, that is the material from those materials passed into separation zone 3 through line 11 which are selectively retained by the adsorbent present in that zone, are removed from the adsorbent by a desorption step. The desorption step comprises the passage of a high concentration of a desorbent material through the adsorbent bed to remove the selectively retained component from the adsorbent. The selectively retained component is then removed from the adsorbent bed in admixture with a desorbent material which passes through line 14 into separation means 4 wherein desorbent material and the selectively retained material can be separated by fractional distillation with the desorbent for purposes of this disclosure passing out of separation means 4 via line 16 while the selectively retained component passes out of separation means 4 via line 17 to be recovered as a product or to be used for further processing.

The overall process flow can be modified as previously indicated by the passage of fresh feed depending upon its character into the process at its "front end" that is via line 6 or in an intermediate point that is via lines 12 or 21. In instances where feed stocks are available which contain both deficient quantities of certain components and substantial concentrations of other component both feed in line 12 or 21 and feed in line 6 can be used with the various proportions of the particular feed stocks passed into the process via these respective lines in a rate which will not upset the operations of process flow of this combination process.

In testing various absorbents, the selectivity as defined previously in Equation 1 was determined using apparatus and procedures generally described below. The apparatus used to measure the selectivity of a particular adsorbent consisted of a chamber of approximately 40 cc. volume having inlet and outlet ports at opposite ends of the chamber. The chamber was contained within a temperature control heating means and, in addition, pressure control equipment was used to operate the chamber at a constant predetermined pressure. Attached to the outlet line connected to the outlet of the chamber was a gas chromatograph which was used to periodically analyze a portion of the effluent stream leaving the adsorbent chamber during adsorption and desorption operations. A feed mixture having a known composition was passed through the adsorbent chamber at a regulated pressure and temperature until the effluent composition flowing from the adsorbent chamber remained at a constant composition indicating that there was not net transfer between the adsorbed phase within the adsorbent and the unadsorbed or external phase surrounding the adsorbent particles. A second mixture containing a hydrocarbon which was able to desorb the previously adsorbed components of the feed from the adsorbent was then passed through the adsorbent chamber. The gas chromatograph was used to monitor the unadsorbed or external phase and the material desorbed from within the adsorbent. Knowing the composition of these two streams and their respective flow rates, a selectivity for various components in the feed stream could be determined.

The feed stream which was used; to measure the selectivities of various adsorbents used in the various adsorption zones consisted or equal quantities (8 and 1/3 vol. percent each) of ethylvenzene, para-xylene and meta-xylene mixed with 2,2,4-trimethylpentane rendering a feed mixture containing 75 vol. percent paraffinic material and 25 vol. percent $C_8$ aromatic isomer material. The $C_8$ aromatic isomers were diluted with the paraffin material to facilitate ease of analyzing the adsorbed and unadsorbed phases for the selectivity determination. Ortho-xylene was excluded, since its presence would have complicated the analytical procedures, although previous experience indicated that the ortho-xylene isomer behaves substantially the same as the meta-xylene isomer. The desorbent material consisted of 25 vol. percent toluene, 74 vol. percent 2,2,4-trimethylpentane and 1 vol. percent selectivities of the combinations of para-xylene and ethylbenzene, para-xylene and meta-xylene, meta-xylene and ethylbenzene.

TABLE I.—SELECTIVITIES AND CAPACITIES OF VARIOUS ADSORBENTS

| Zeolite type | Cation(s) on sieve | Capacity, ml./40 ml. sieve | | | Selectivity, B | | | Adsorbent description |
|---|---|---|---|---|---|---|---|---|
| | | P | M | E | | P/E | P/M | M/E | |
| Y | Li | 1.74 | 2.43 | 1.14 | 5.31 | 1.52 | 0.72 | 2.13 | A |
| Y | Na | 1.69 | 2.23 | 1.28 | 5.20 | 1.32 | 0.75 | 1.74 | B |
| Y | K | 2.05 | 1.12 | 1.76 | 4.93 | 1.16 | 1.83 | 0.64 | C |
| Y | Rb | 1.84 | 1.22 | 1.92 | 4.98 | 0.96 | 1.51 | 0.64 | D |
| Y | Cs | 1.38 | 0.92 | 1.73 | 4.03 | 0.80 | 1.50 | 0.53 | E |
| Y | Ba | 0.84 | 0.93 | 0.78 | 2.55 | 1.08 | 0.90 | 1.19 | F |
| Y | Mg | 1.55 | 2.65 | 0.93 | 5.13 | 1.67 | 0.59 | 2.85 | G |
| Y | Ca | 1.01 | 2.86 | 0.86 | 4.73 | 1.17 | 0.35 | 3.32 | H |
| Y | Sr | 1.12 | 2.56 | 0.80 | 4.48 | 1.40 | 0.44 | 3.20 | I |
| Y | Ba | 1.51 | 1.19 | 0.82 | 3.52 | 1.85 | 1.27 | 1.45 | J |
| Y | K, Ba | 2.70 | 0.72 | 1.29 | 4.71 | 2.10 | 3.76 | 0.56 | K |
| Y | K, Be | 2.24 | 1.06 | 1.55 | 4.85 | 1.44 | 2.11 | 0.68 | L |
| Y | K, Mg | 2.16 | 0.96 | 1.54 | 4.66 | 1.41 | 2.25 | 0.62 | M |
| Y | K, Rb | 1.70 | 0.94 | 1.60 | 4.24 | 1.06 | 1.80 | 0.59 | N |
| Y | K, Cs | 1.72 | 0.97 | 1.67 | 4.37 | 1.03 | 1.79 | 0.58 | O |
| Y | Rb, Ba | 2.03 | 0.99 | 1.44 | 4.46 | 1.41 | 2.05 | 0.69 | P |
| Y | Cs, Ba | 1.86 | 1.18 | 1.43 | 4.47 | 1.30 | 1.57 | 0.82 | Q |
| X | Na | 1.50 | 1.48 | 1.30 | 4.28 | 1.15 | 1.02 | 1.14 | R |
| X | Ba, K | 2.47 | 0.99 | 1.22 | 4.68 | 2.03 | 2.49 | 0.81 | S |
| X | Ag | 1.63 | 1.53 | 1.18 | 4.34 | 1.38 | 1.07 | 1.30 | T |
| Y | Mn | 1.14 | 1.74 | 0.91 | 3.79 | 1.25 | 0.60 | 1.91 | U |
| Y | Cd | 1.13 | 1.84 | 0.94 | 3.91 | 1.19 | 0.61 | 1.96 | V |
| Y | Cu, Cd | 1.18 | 2.18 | 0.98 | 4.34 | 1.20 | 0.54 | 2.22 | W |
| Y | Cu, Ag | 1.67 | 2.65 | 1.06 | 5.38 | 1.58 | 0.63 | 2.50 | X |
| Y | Zn, Ag | 2.33 | 2.63 | 1.46 | 6.42 | 1.59 | 0.89 | 1.80 | Y |
| Y | Cu | 1.33 | 2.14 | 0.91 | 4.38 | 1.46 | 0.62 | 2.36 | Z |
| Y | Cu, K | 1.90 | 1.15 | 1.60 | 4.65 | 1.19 | 1.65 | 0.72 | AA | neohexane which was used as a tracer to determine desorbent breakthrough in the effluent stream leaving the adsorbent chamber. The adsorption and desorption cycles were performed in the vapor phase at about 260° C. and slightly above atmospheric pressure.

The following example and illustrative embodiment more specifically show the various adsorbents and catalysts which can be used in the various units for the process of this invention and are not to be construed as undue limitations on the claimed invention.

EXAMPLE

In this example, various adsorbents were tested using the testing procedure as described previously to determine the capacity and selectivity of the various adsorbents for various $C_8$ aromatic isomers. The two basic starting materials used in the production of the various adsorbents tested in this example were the Type X or Type Y structured zeolites. The adsorbents as indicated in the following table contained various single cations or combination of two cations present within the zeolite and were essentially totally ion-exchanged, that is, most of the cationic sites within the Type X or Type Y structure zeolite contained the indicated cation. An arbitary cationic exchange procedure is described below.

A chromatographic-type exchange column was used to perform the cation exchange. The total number of cation equivalents used to exchange the original sodium form of the Type X or Type Y zeolite was three times the total equivalents of sodium present in the zeolite. The volume of solution containing the cations was six times the volume of the Type X or Type Y starting material with the cation solution flow rate at approximately 80 to 100 ml. per hour passing through the zeolite. Whenever two cations were used to simultaneously exchange the sodium in the original Type X or Type Y zeolite, the total number of equivalents of each cation used was halved; all other conditions remained equal. After the cation exchange procedure had been completed, the adsorbent was water-washed, air-equilibrated and finall treated with air in a muffle furnace at about 550° C. After heating, the sieves were cooled in an inert atmosphere containing no water and then used in the adsorbent chamber as previously described. Table I below shows the capacity of the sieve for various $C_8$ aromatic isomers represented by the milliliters of the particular $C_8$ aromatic isomer adsorbed per 40 ml. of sieve in the adsorbent chamber. The selectivities were determined using Equation 1 above and are represented for determining the

ILLUSTRATIVE EMBODIMENT

In this illustrative embodiment the combination of an isomerization and adsorptive-separative step is illustrated. The feed stock used is a xylene mixture although the diethylbenzenes may be used with similar type results.

The isomerization zone employed herein utilizes a relatively active catalyst which would isomerize a portion of the ethylbenzene present in the material feed to the isomerization zone. Specifically the catalyst contained about 0.375 wt. percent platinum and 1.90 wt. percent fluorine based on volatile free catalyst present on spherical alumina spheres. The operating conditions of the isomerization zone were as follows:

Liquid hourly space velocity: 2.0
Reactor outlet pressure: 175 p.s.i.g.
Reactor inlet temperature: 750° F.
Mol. ratio of hydrogen over hydrocarbon feed: 6
Hydrogen purity of recycle gas: 80 vol. percent
Chlorine addition based on reactor feed: 50 p.p.m.

The separation zone employed in this illustration contained an adsorbent which was a type X structed zeolite which contained about 1.3 wt. percent sodium, 3.5 wt. percent potassium and 18.6 wt. percent barium. The adsorbent was about 20–40 mesh in particle size and weighed about 48 lbs./cubic feet. The adsorption and desorption operations were effected at 350 F. and 140 p.s.i.g., which resulted in liquid phase operations. The fresh feed used was a xylene isomer mixture having the following composition:

| Component: | Wt. percent |
|---|---|
| Toluene | 0.8 |
| Ethylbenzene | 15.7 |
| Paraxylene | 15.7 |
| Metaxylene | 37.6 |
| Orthoxylene | 19.1 |
| $C_9^+$ aromatics | 21.1 |
| | 100.0 |

The operational sequences which were used in the separation zone were as follows. A stream containing xylene isomers was contacted with a portion of the above described adsorbent. Paraxylene was allowed to be adsorbed by the adsorbent after which the material which was not selectively retained by the adsorbent was withdrawn from the adsorbent as a raffinate stream. The adsorbent was then contacted with a desorbent material comprising an isomer mixture of diethylbenzenes which displaced the selectively adsorbed paraxylene from the adsorbent. The paraxylene was recovered and separated from the diethylbenzene. The raffinate material was passed to the isomerization zone for partial conversion to paraxylene.

The overall flow sequence used was similar to that disclosed in the attached drawing. The feed stock was passed into the process via line 21 because it contained a quantity of $C_9+$ heavy aromatics which were removed via the bottom stream (line 10) on separation means 2. Most of the raffinate material withdrawn from separation zone 3 was recycled to isomerization zone 1, except for a small portion removed from the process via line 19.

An overall material balance of the combination is shown in Table II below:

TABLE II.—PROCESS FLOW MATERIAL BALANCE IN POUNDS PER HOUR

| Component | 20 | 21 | 9 | 10 | 11 | 17 | 19 |
|---|---|---|---|---|---|---|---|
| $C_1$ | | | | 0.12 | | | |
| $C_2$ | | | | 0.32 | | | |
| $C_3$ | | | | 0.61 | | | |
| $C_4$ | | | | 1.20 | | | |
| $C_5$ | | | | 0.63 | | | |
| $C_6$ saturate | | | | 0.26 | | | |
| $C_7$ | | | | 0.79 | | | |
| Benzene | | | | 0.38 | | | |
| Toluene | 6.84 | 1.00 | | 0.56 | 8.31 | 0.80 | 0.67 |
| $C_8$ paraffin | 2.21 | | | 0.75 | 2.43 | | 0.22 |
| $C_8$ naphthene | 15.22 | | | | 16.71 | | 1.49 |
| Ethylbenzene | 44.15 | 19.45 | | | 48.48 | | 4.32 |
| Paraxylene | 8.06 | 19.45 | | | 58.84 | 50.00 | .79 |
| Metaxylene | 136.47 | 45.40 | | | 149.84 | | 13.36 |
| Orthoxylene | 31.96 | 23.70 | | 28.00 | 35.09 | | 3.13 |
| $C_9+$ aromatics | | 15.00 | | 16.06 | | | |

The extract stream withdrawn from separation zone 3 via line 14 contained approximately 19.6 vol. percent paraxylene with the remaining portion of the extract stream comprising diethylbenzene desorbent material. The raffinate stream withdrawn from separation zone 3 via line 15 contained about 72.5 vol. percent diethylbenzene and 27.5 vol. percent of the less selectively retained components of the feed stock.

In this particular example the raffinate material was recycled to the isomerization zone, however the process is not limited to that particular type of flow scheme. As previously mentioned the extract material may also be recycled to the isomerization zone.

In referring to the adsorbents listed in Table II above, there are listed some adsorbents which provide a greater selectivity for metaxylene than paraxylene. These adsorbents, for example adsorbents A, B, F, G, H, I, U, V, W, X, Y and Z, would provide a system in which metaxylene would be preferentially adsorbed with most of the other isomers exclude. In this instance the extract material would be metaxylene while the raffinate material would contain paraxylene, ethylbenzene and orthoxylene. The same general selectivities would be present for instances in which the diethylbenzenes are used.

PREFERRED EMBODIMENT

A preferred embodiment of the present process resides in a combination process in which an aromatic hydrocarbon stream is contacted with a crystalline aluminosilicate adsorbent at conditions to effect the selective retention of a component of said hydrocarbon stream; a selectively retained material and a non-selectively retained material are recovered from said adsorbent and a portion of one of these two materials is passed into an isomerization zone at conditions to effect the production of additional amounts of the materials comprising said hydrocarbon stream.

I claim as my invention:

1. A process for the production and recovery of a selected aromatic hydrocarbon which process comprises the steps of:
   (I) Passing a portion of an effluent stream from an isomerization zone in admixture with a fresh feed stream into a mass of a crystalline aluminosilicate adsorbent at adsorption conditions to effect the selective retention of an extract material containing at least one component of said admixture;
   (II) Withdrawing from the mass of adsorbent a raffinate stream containing a less selectively retained portion of said admixture;
   (III) Contacting said mass of adsorbent at desorption condition with a desorbent material to effect removal of extract material from said adsorbent;
   (IV) Withdrawing from the mass of adsorbent an extract stream comprising said desorbent and said extract material;
   (V) Passing a portion of one of said streams withdrawn from said mass of adsorbent into an isomerization zone at conditions to effect the production of additional quantities of components present in said other stream withdrawn from said mass of adsorbent;
   (VI) Passing a portion of an effluent stream from said isomerization zone to said mass of adsorbent.

2. The process of claim 1 further characterized in that said adsorbent is selected from the group consisting of type X and type Y structured zeolites.

3. The process of claim 2 further characterized in that said zeolites contain at least one cation or cation pairs selected from the group consisting of potassium, barium, silver, cesium, praseodymium, neodymium, samarium, beryllium and potassium, magnesium and potassium, rubidium and potassium, cesium and potassium, rubidium and barium, cesium and barium, and copper and potassium and combinations thereof.

4. The process of claim 3 further characterized in that said adsorbent is a type X structured zeolite.

5. The process of claim 3 further characterized in that said adsorbent is a type Y structured zeolite.

6. The process of claim 1 further characterized in that said admixture of fresh feed and isomerization zone effluent contains at least two aromatic components selected from the group consisting of orthoxylene, metaxylene, paraxylene and ethylbenzene.

7. The process of claim 6 further characterized in that said extract material comprises paraxylene.

8. The process of claim 7 further characterized in that said raffinate stream contains aromatic hydrocarbons selected from the group consisting of orthoxylene, metaxylene and ethylbenzene.

9. The process of claim 8 further characterized in that said raffinate stream is passed into said isomerization zone.

10. The process of claim 8 further characterized in that said extract material is passed into said isomerization zone.

11. The process of claim 1 further characterized in that said desorbent has an average boiling point lower than the average boiling point of said selectively retained component of said admixture.

12. The process of claim 11 further characterized in that said desorbent comprises toluene.

13. The process of claim 1 further characterized in that said desorbent has an average boiling point higher than the average boiling point of said selectively retained component of said feed.

14. The process of claim 13 further characterized in that said desorbent comprises diethylbenzene.

15. The process of claim 1 further characterized in that said desorption and adsorption conditions include a temperature of from about 50° F. to about 490° F.

16. The process of claim 15 further characterized in that said desorption and adsorption conditions are effected in the liquid phase.

17. A process for the production and recovery of a selected aromatic hydrocarbon which process comprises the steps of:
(I) Passing a portion of an effluent stream from an isomerization zone into a mass of a crystalline aluminosilicate adsorbent at adsorption conditions to effect the selective retention of an extract material containing at least one component of said effluent;
(II) Withdrawing from the mass of adsorbent a raffinate stream containing a less selectively retained portion of said effluent;
(III) Contacting said mass of adsorbent at desorption condition with a desorbent material to effect removal of said extract material from said adsorbent;
(IV) Withdrawing from the mass of adsorbent an extract stream comprising said desorbent and said extract material;
(V) Passing a portion of one of said streams withdrawn from said mass of adsorbent together with a fresh feed stream into an isomerization zone at conditions to effect the production of additional quantities of components present in said other stream withdrawn from said mass of adsorbent; and
(VI) Passing a portion of an effluent stream from said isomerization zone to said mass of adsorbent.

18. The process of claim 17 further characterized in that said adsorbent is selected from the group consisting of type X and type Y structured zeolites.

19. The process of claim 18 further characterized in that said zeolites contain at least one cation or cation pairs selected from the group consisting of potassium, barium, silver, cesium, praseodymium, samarium, beryllium and potassium, magnesium and potassium, rubidium and potassium, cesium and potassium, rubidium and barium, cesium and barium, and copper and potassium and combinations thereof.

20. The process of claim 19 further characterized in that said adsorbent is a type X structured zeolite.

21. The process of claim 19 further characterized in that said adsorbent is a type Y structured zeolite.

22. The process of claim 17 further characterized in that said fresh feed contains at least two aromatic components selected from the group consisting of orthoxylene, metaxylene, paraxylene and ethylbenzene.

23. The process of claim 22 further characterized in that said extract material comprises paraxylene.

24. The process of claim 23 further characterized in that said raffinate stream contains aromatic hydrocarbons selected from the group consisting of orthoxylene, metaxylene and ethylbenzene.

25. The process of claim 23 further characterized in that said raffinate stream is passed into said isomerization zone.

26. The process of claim 23 further characterized in that said extract material is passed into said isomerization zone.

27. The process of claim 17 further characterized in that said desorbent has an average boiling point lower than the average boiling point of said selectively retained component of said admixture.

28. The process of claim 27 further characterized in that said desorbent comprises toluene.

29. The process of claim 17 further characterized in that said desorbent has an average boiling point higher than the average boiling point of said selectively retained component of said feed.

30. The process of claim 29 further characterized in that said desorbent comprises diethylbenzene.

31. The process of claim 17 further characterized in that said desorption and adsorption conditions include a temperature of from about 50° F. to about 490° F.

32. The process of claim 31 further characterized in that said desorption and adsorption conditions are effected in the liquid phase.

References Cited

UNITED STATES PATENTS

| 3,133,126 | 5/1964 | Fleck et al. | 260—674 |
| 3,377,400 | 4/1968 | Wise | 260—668 |
| 3,409,686 | 11/1968 | Mitsche | 260—668 |
| 3,525,775 | 8/1970 | Bolton et al. | 260—668 |

CURTIS R. DAVIS, Primary Examiner

U.S. Cl. X.R.

260—674 A, 674 SA